United States Patent
Wang et al.

(10) Patent No.: US 11,619,593 B2
(45) Date of Patent: Apr. 4, 2023

(54) METHODS AND SYSTEMS FOR DETECTING A DEFECT OF A FILM

(71) Applicant: ZHEJIANG GONGSHANG UNIVERSITY, Zhejiang (CN)

(72) Inventors: Huiyan Wang, Hangzhou (CN); Zeyuan Shao, Hangzhou (CN)

(73) Assignee: ZHEJIANG GONGSHANG UNIVERSITY, Hangzhou (CN)

( * ) Notice: Subject to any disclaimer, the term of this patent is extended or adjusted under 35 U.S.C. 154(b) by 0 days.

(21) Appl. No.: 17/806,719

(22) Filed: Jun. 13, 2022

(65) Prior Publication Data

US 2022/0381699 A1 Dec. 1, 2022

Related U.S. Application Data

(63) Continuation of application No. PCT/CN2021/105737, filed on Jul. 12, 2021.

(30) Foreign Application Priority Data

Jun. 1, 2021 (CN) .......................... 202110609602.7

(51) Int. Cl.
G06K 9/00 (2022.01)
G01N 21/88 (2006.01)
G06T 7/00 (2017.01)

(52) U.S. Cl.
CPC ......... *G01N 21/8851* (2013.01); *G06T 7/001* (2013.01); *G01N 2021/8854* (2013.01);
(Continued)

(58) Field of Classification Search
CPC ........ G01N 21/8851; G01N 2021/8854; G06T 7/001; G06T 2207/20084; G06T 2207/30108
See application file for complete search history.

(56) References Cited

U.S. PATENT DOCUMENTS

| 2002/0131648 A1* | 9/2002 | Hayashide | ................ G06T 5/50 |
| | | | 250/341.8 |
| 2004/0109016 A1* | 6/2004 | Antonellis | ............. H04N 5/913 |
| | | | 386/E5.004 |

(Continued)

FOREIGN PATENT DOCUMENTS

| CN | 109191511 A | 1/2019 |
| CN | 110175993 A | 8/2019 |

(Continued)

OTHER PUBLICATIONS

First Office Action in Chinese Application No. 202110609602.7 dated May 26, 2022, 9 pages.

(Continued)

*Primary Examiner* — Samir A Ahmed
(74) *Attorney, Agent, or Firm* — Metis IP LLC

(57) ABSTRACT

The present disclosure provides a method for detecting a defect of a film. The method includes obtaining a film image, determining one or more pieces of scratch information corresponding to the film image through processing the film image using a recognition model, the recognition model includes a convolution layer, a regression layer, and a classification layer, determining whether each piece of scratch information in the one or more pieces of scratch information meets a preset condition, each piece of scratch information includes position information, angle information, and size information, in response to a determination that each piece of scratch information meets the preset condition, adding one or more pieces of annotation information to the one or more pieces of scratch information that meets the preset condition, and generating prompt information based on the one or more pieces of annotation information.

3 Claims, 8 Drawing Sheets

(52) U.S. Cl.
CPC ............... *G06T 2207/20084* (2013.01); *G06T 2207/30108* (2013.01)

(56) References Cited

U.S. PATENT DOCUMENTS

| | | | | |
|---|---|---|---|---|
| 2005/0238167 | A1* | 10/2005 | Duffield | H04N 5/913 380/203 |
| 2019/0379883 | A1* | 12/2019 | Wang | G06N 3/0436 |

FOREIGN PATENT DOCUMENTS

| | | | |
|---|---|---|---|
| CN | 110348282 | A | 10/2019 |
| CN | 111402254 | A | 7/2020 |
| CN | 111524135 | A | 8/2020 |
| CN | 112132828 | A | 12/2020 |
| CN | 112233090 | A | 1/2021 |
| CN | 112614101 | A | 4/2021 |
| CN | 112861803 | A | 5/2021 |
| EP | 3315950 | A1 | 5/2018 |
| JP | 2004354251 | A | 12/2004 |
| JP | 2019211310 | A | 12/2019 |

OTHER PUBLICATIONS

International Search Report in PCT/CN2021/105737 dated Feb. 25, 2022, 8 pages.
Written Opinion in PCT/CN2021/105737 dated Feb. 25, 2022, 8 pages.

\* cited by examiner

| layer name | output size | 18-layer | 34-layer | 50-layer | 101-layer | 152-layer |
|---|---|---|---|---|---|---|
| conv1 | 112×112 | | | 7×7, 64, stride 2 | | |
| conv2_x | 56×56 | | | 3×3 max pool, stride 2 | | |
| | | $\begin{bmatrix} 3\times3, 64 \\ 3\times3, 64 \end{bmatrix} \times 2$ | $\begin{bmatrix} 3\times3, 64 \\ 3\times3, 64 \end{bmatrix} \times 3$ | $\begin{bmatrix} 1\times1, 64 \\ 3\times3, 64 \\ 1\times1, 256 \end{bmatrix} \times 3$ | $\begin{bmatrix} 1\times1, 64 \\ 3\times3, 64 \\ 1\times1, 256 \end{bmatrix} \times 3$ | $\begin{bmatrix} 1\times1, 64 \\ 3\times3, 64 \\ 1\times1, 256 \end{bmatrix} \times 3$ |
| conv3_x | 28×28 | $\begin{bmatrix} 3\times3, 128 \\ 3\times3, 128 \end{bmatrix} \times 2$ | $\begin{bmatrix} 3\times3, 128 \\ 3\times3, 128 \end{bmatrix} \times 4$ | $\begin{bmatrix} 1\times1, 128 \\ 3\times3, 128 \\ 1\times1, 512 \end{bmatrix} \times 4$ | $\begin{bmatrix} 1\times1, 128 \\ 3\times3, 128 \\ 1\times1, 512 \end{bmatrix} \times 4$ | $\begin{bmatrix} 1\times1, 128 \\ 3\times3, 128 \\ 1\times1, 512 \end{bmatrix} \times 8$ |
| conv4_x | 14×14 | $\begin{bmatrix} 3\times3, 256 \\ 3\times3, 256 \end{bmatrix} \times 2$ | $\begin{bmatrix} 3\times3, 256 \\ 3\times3, 256 \end{bmatrix} \times 6$ | $\begin{bmatrix} 1\times1, 256 \\ 3\times3, 256 \\ 1\times1, 1024 \end{bmatrix} \times 6$ | $\begin{bmatrix} 1\times1, 256 \\ 3\times3, 256 \\ 1\times1, 1024 \end{bmatrix} \times 23$ | $\begin{bmatrix} 1\times1, 256 \\ 3\times3, 256 \\ 1\times1, 1024 \end{bmatrix} \times 36$ |
| conv5_x | 7×7 | $\begin{bmatrix} 3\times3, 512 \\ 3\times3, 512 \end{bmatrix} \times 2$ | $\begin{bmatrix} 3\times3, 512 \\ 3\times3, 512 \end{bmatrix} \times 3$ | $\begin{bmatrix} 1\times1, 512 \\ 3\times3, 512 \\ 1\times1, 2048 \end{bmatrix} \times 3$ | $\begin{bmatrix} 1\times1, 512 \\ 3\times3, 512 \\ 1\times1, 2048 \end{bmatrix} \times 3$ | $\begin{bmatrix} 1\times1, 512 \\ 3\times3, 512 \\ 1\times1, 2048 \end{bmatrix} \times 3$ |
| | 1×1 | | | average pool, 1000-d fc, softmax | | |
| FLOPs | | $1.8\times10^9$ | $3.6\times10^9$ | $3.8\times10^9$ | $7.6\times10^9$ | $11.3\times10^9$ |

FIG. 7

METHODS AND SYSTEMS FOR DETECTING A DEFECT OF A FILM

CROSS-REFERENCE TO RELATED APPLICATION

This application is a continuation of International Patent Application No. PCT/CN2021/105737, filed on Jul. 12, 2021, which claims priority of Chinese Patent Application No. 202110609602.7, filed on Jun. 1, 2021, the contents of each of which are entirely incorporated herein by reference.

TECHNICAL FIELD

The present disclosure relates to the field of information technology, and more particularly to methods and systems for detecting a defect of a film.

BACKGROUND

With the growing demand for films, more and more companies have begun to pay attention to control of film quality during a process of film manufacturing. Due to influence of manufacturing technology and environment, various defects may appear on a surface of the film. A shape of scratches on the film is often irregular, uncertainty of distribution position of the scratches on the film is large, the scratches on the film exist a certain rotation angle, and features of the scratches on the film are complex, resulting that low detection accuracy.

Therefore, it is desirable to provide a method and a system for detecting a defect of a film, which may process a film image using a recognition model and perform a defect detection on scratches of the film, so as to optimize a speed of the detection, improve an accuracy of the detection, and save manpower and material resources.

SUMMARY

One aspect of some embodiments of the present disclosure provides a method for detecting a defect of a film. The method includes obtaining a film image, determining one or more pieces of scratch information corresponding to the film image through processing the film image using a recognition model, the recognition model including a convolution layer, a regression layer, and a classification layer, determining whether each piece of scratch information in the one or more pieces of scratch information meets a preset condition, each piece of scratch information including position information, angle information, and size information, in response to a determination that each piece of scratch information meets the preset condition, adding one or more pieces of annotation information to the one or more pieces of scratch information that meets the preset condition, and generating prompt information based on the one or more pieces of annotation information.

One aspect of some embodiments of the present disclosure provides a system for detecting a defect of a film, the system being implemented on a computing device, includes at least one storage medium including a set of instructions for detecting the defect of the film, at least one processor, in communication with the at least one storage medium, when executing the set of instructions, the at least one processor is configured to cause the system to perform operations. The operations include obtaining a film image, determining one or more pieces of scratch information corresponding to the film image through processing the film image using a recognition model, the recognition model including a convolution layer, a regression layer, and a classification layer, determining whether each piece of scratch information in the one or more pieces of scratch information meets a preset condition, each piece of scratch information including position information, angle information, and size information, in response to a determination that each piece of scratch information meets the preset condition, adding one or more pieces of annotation information to the one or more pieces of scratch information that meets the preset condition, generating prompt information based on the one or more pieces of annotation information Another aspect of some embodiments of the present disclosure provides a non-transitory computer-readable storage medium storing a set of instructions, when executed by at least one processor, causing the at least one processor to perform a method for detecting a defect of a film as described in the above embodiments.

BRIEF DESCRIPTION OF THE DRAWINGS

The present disclosure will be further described by way of exemplary embodiments, which will be described in detail with reference to the accompanying drawings. These examples are not limiting, and in these embodiments, the same numbers refer to the same structures, wherein:

FIG. 7 is a schematic diagram of a Resnet-50 network layer according to some embodiments of the present disclosure.

DETAILED DESCRIPTION

Figure 1:
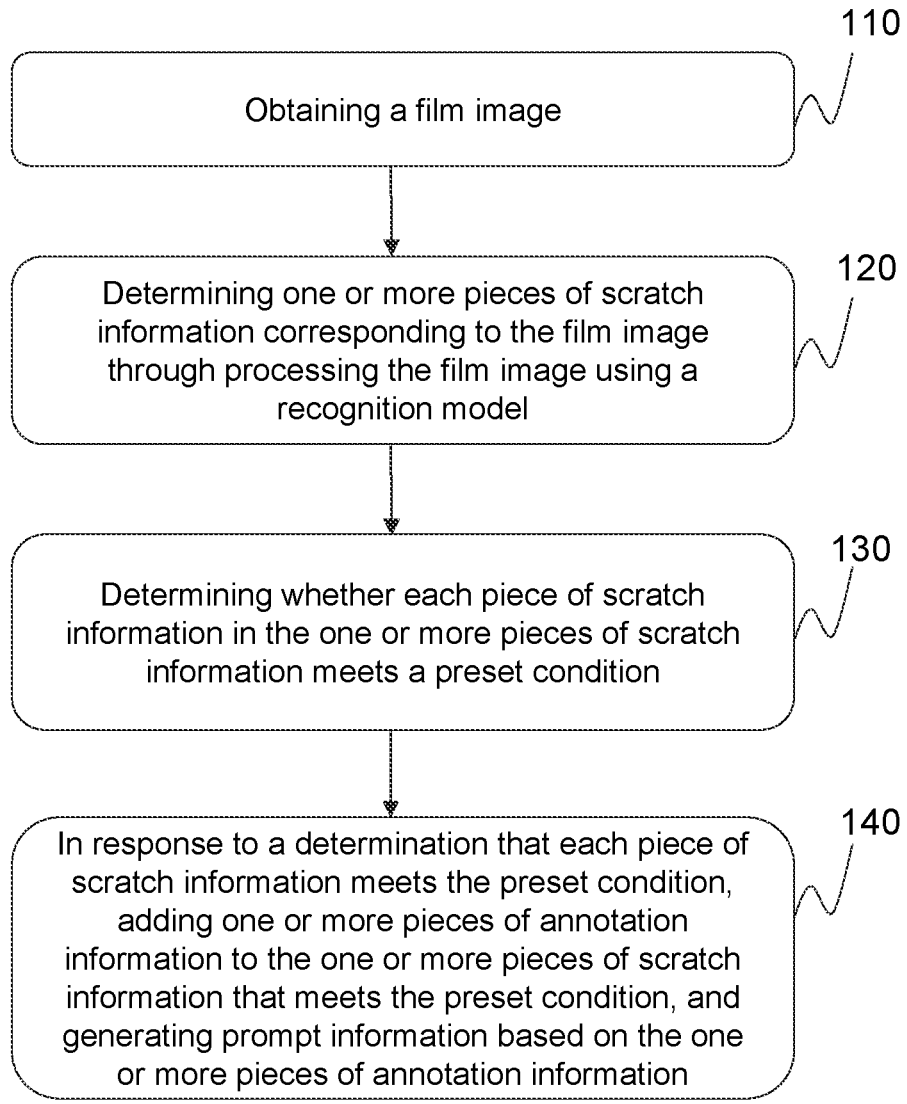
FIG. 1 is a flowchart illustrating an exemplary process of a method for detecting a defect of a film according to some embodiments of the present disclosure.

In order to more clearly illustrate the technical solutions of the embodiments of the present disclosure, the following will briefly introduce the drawings that need to be used in the description of the embodiments. Obviously, the drawings in the following description are only some examples or embodiments of the disclosure. For those of ordinary skill in the art, without creative work, the disclosure can be applied to other similar scenarios according to these drawings. Unless it is obvious from the language environment or otherwise stated, the same reference numbers in the drawings represent the same structure or operation.

It should be understood that the "system", "device", "unit" and/or "module" used herein is a method for distinguishing different components, elements, parts, parts, or assemblies of different levels. However, if other words can achieve the same purpose, the words can be replaced by other expressions.

As shown in the present disclosure and the claims, unless the context clearly suggests exceptional circumstances, the words "a", "an", "an" and/or "the" do not only specifically refer to the singular, but also include the plural. Generally speaking, the terms "including" and "contain" only suggest that the operations and elements that have been clearly identified are included, and these operations and elements do not constitute an exclusive list, and the method or device may also include other operations or elements.

Flowcharts are used in the present disclosure to illustrate the operations performed by the system according to the embodiments of the present disclosure. It should be understood that the preceding or following operations are not necessarily performed precisely in order. Instead, the individual operations can be processed in reverse order or simultaneously. At the same time, users can also add other operations to these processes, or remove an operation or several operations from these processes.

FIG. 1 is a flowchart illustrating an exemplary process of a method for detecting a defect of a film according to some embodiments of the present disclosure. As shown in FIG. 1, a process 100 may include following operations. In some embodiments, the process 100 may be performed by at least one processor.

In operation 110, obtaining a film image.

The film refers to a diaphragm formed by a thin soft material. Specifically, the film may be made of plastic, adhesive, rubber or other materials. For example, the film may include a polyester film, a nylon film, etc.

The film image refers to an image that may reflect a state of the film. In some embodiments, the film image may be an image taken from multiple angles and locations.

In some embodiments, an obtaining module may be configured to obtain the film image from a terminal device or a storage device through a network. In some embodiments, the film image may be collected using an image collection device.

In operation 120, determining one or more pieces of scratch information corresponding to the film image through processing the film image using a recognition model.

The scratch information refers to information related to scratches on the surface of the film. The scratch information may be one or more pieces and include position information, angle information, size information, shape information, etc.

In some embodiments, one or more pieces of scratch information corresponding to the film image may be determined based on the film image using the recognition model. In some embodiments, the recognition model may be a Convolutional Neural Network (CNN) model.

In some embodiments, one or more pieces of scratch information corresponding to the film image may be determined through processing the film using a recognition model.

In some embodiments, the film image of the film may be used as an input of the recognition model, and the recognition model may output one or more pieces of scratch information corresponding to the film image.

In some embodiments, parameters of the recognition model may be obtained through training an initial recognition model. Multiple sets of training samples may be obtained, and each set of training samples may include training data and labels corresponding to the training data. The training data may be historical film images and the labels may be scratch information determined based on historical film images.

In some embodiments, the recognition model may be obtained by training multiple training samples with labels. For example, multiple training samples with labels may be input into an initial recognition model, a loss function may be constructed from the labels and results of the initial recognition model. Parameters of the initial recognition model may be iteratively updated based on the loss function through gradient descent or other methods to reduce a loss function value until a preset condition is met. When the preset condition is met, the training of the recognition model is completed, and a trained authenticity evaluation model is obtained. The preset condition may be that the loss function converges, a count of iterations reaches a threshold, etc.

In some embodiments of the present disclosure, the thin film image is processed based on the recognition model to determine the scratch information, which may reduce difficulty of detecting film scratches and save manpower and material resources.

Figure 2:
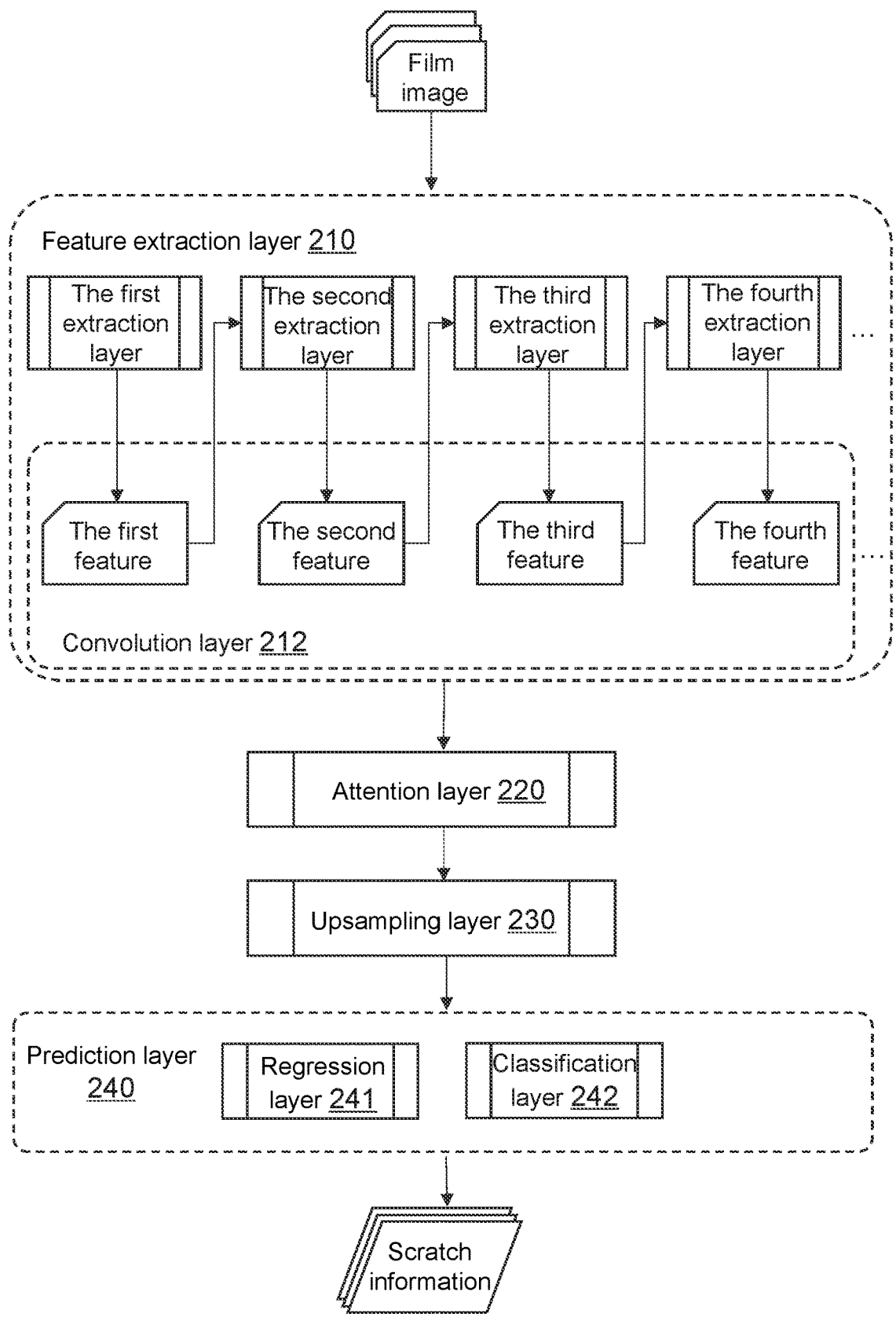
FIG. 2 is a structural diagram of a recognition model of a method for detecting a defect of a film according to some embodiments of the present disclosure.

More descriptions regarding the recognition model may be found elsewhere in the present disclosure, e.g., FIG. 2 and its relevant descriptions.

In operation 130, determining whether each piece of scratch information in the one or more pieces of scratch information meets a preset condition.

The preset condition may refer to a condition set in advance, which may include a position condition, an angle condition, a size condition, etc.

In operation 140, in response to a determination that each piece of scratch information meets the preset condition, adding one or more pieces of annotation information to the one or more pieces of scratch information that meets the preset condition, and generating prompt information based on the one or more pieces of annotation information.

The annotation information refers to information marked after the scratch information is processed, which may include position annotation information, angle annotation information, size annotation information, etc.

The prompt information refers to information used for reminding based on annotation information. In some embodiments, the prompt information may include position prompt information, angle prompt information, size prompt information, etc.

In some embodiments, a prompt module may add one or more pieces of annotation information based on one or more pieces of scratch information and generate prompt information based on the one or more pieces of annotation information. In some embodiments, the annotation information may be manually added based on the one or more pieces of scratch information. In some embodiments, the prompt information may be generated based on one or more pieces of annotation information through a preset algorithm.

In some embodiments of the present disclosure, a film image is obtained, scratch information is output based on a recognition model, and annotation information is added based on the scratch information to generate prompt information, which may reduce difficulty of detection of film scratches, reduce missed detection of film scratches, and improve detection accuracy of film scratches.

It should be noted that the above description of the process of the method for detecting a defect of a film is only for illustration and description and does not limit the scope of application of the present disclosure. For those skilled in the art, various corrections and changes may be made to the process of the method for detecting a defect of a film under the guidance of the present disclosure. However, these corrections and changes are still within the scope of the present disclosure.

FIG. 2 is a structural diagram of a recognition model of a method for detecting a defect of a film according to some embodiments of the present disclosure.

A structure 200 of the recognition model may include a feature extraction layer 210, an attention layer 220, an upsampling layer 230, and a prediction layer 240. The feature extraction layer 210 may include a convolution layer 212, and the prediction layer 240 may include a regression layer 241 and a classification layer 242.

In some embodiments, features of the film image related to the film image may be determined based on the film image through the feature extraction layer 210. The feature extraction layer 210 may obtain initial features of the film image by one or more processes including a convolution, a residual, etc.

In some embodiments, calculated features of the film image may be determined based on the initial features of the film image obtained by the feature extraction layer 210 through the attention layer 220. The attention layer 220 may obtain the features of the film image by one or more processes including a convolution, a weight, a fusion calculation, etc.

In some embodiments, the attention layer 220 may be a Transformer, etc.

In some embodiments, calculated upsampled features may be determined based on the calculated features of the film image obtained by the attention layer 220 through the upsampling layer 230. The upsampling layer 230 may obtain upsampling features through a convolution.

In some embodiments, corresponding one or more pieces of scratch information may be determined based on the calculated upsampled features obtained by the upsampling layer 230 through the prediction layer 240.

In some embodiments, the feature extraction layer 210 may be used to extract the features of the film image.

In some embodiments, the input of the feature extraction layer 210 may be a film image, and the output of the feature extraction layer 210 may be feature of the film image. In some embodiments, the feature extraction layer 210 may be a Resnet-50 (Residual Network-50) network.

Resnet-50 network refers to a residual network with 50 layers of network structure. The structure of the residual network is similar to that of the convolutional neural network, but in addition to processing the input data in the backbone network, different processing layers of bypass connection is added. For example, for a residual network with three layers C1, C2, and C3, in addition to processing the input data from C1 to C2 to C3, processing the input data from C1 to C3 is also added. The residual network alleviates problem of network instability and reduced classification effect caused by too many layers of traditional convolutional neural network.

In some embodiments, sub-features of the film image may be extracted by sub-extraction layers. In some embodiments, the feature extraction layer 210 may include at least four sub-extraction layers in series, for example, a first extraction layer, a second extraction layer, a third extraction layer, and a fourth extraction layer. An output of each layer corresponds to a first feature, a second feature, a third feature, and a fourth feature respectively.

In some embodiments, the first extraction layer, the second extraction layer, the third extraction layer, and the fourth extraction layer may correspond to a Stage 1 layer, a Stage 2 layer, a Stage 3 layer, and a Stage 4 layer of the Resnet-50 network. The division methods of the Stage 1 layer, the Stage 2 layer, the Stage 3 layer, and the Stage 4 layer in the Resnet-50 network may correspond to a conv2_x layer, a conv3_x layer, a conv4_x layer, and a conv5_x layer shown in the 50-layer column of FIG. 7. In some embodiments, the Stage 1 layer corresponds to the conv2_x layer, the Stage 2 layer corresponds to the conv3_x layer, the Stage 3 layer corresponds to the conv4_x layer, and the Stage 4 layer corresponds to the conv5_x layer.

In some embodiments, at least one of the at least four sub-extraction layers includes performing convolution processing and residual processing on features output by a previous sub-extraction layer. For example, the second sub-extraction layer may perform convolution processing and residual processing on the first features output by the first sub-extraction layer.

In some embodiments, the second extraction layer is obtained by a modification on the Stage 2 layer of the Resnet-50 network, the modification including removing residual edges in the Stage 2 layer and modifying a stride of a convolution kernel in the Stage 2 layer to 1.

In some embodiments, removing the residual edges of the second extraction layer may save hardware resources for deployment and reduce calculation complexity.

In some embodiments, scratch defect data of the film is less, the target is small, and the features are not obvious, the stride of the convolution kernel is set as 1, which may extract more detailed information to improve the detection effect of defect information of the film.

Figure 3A:
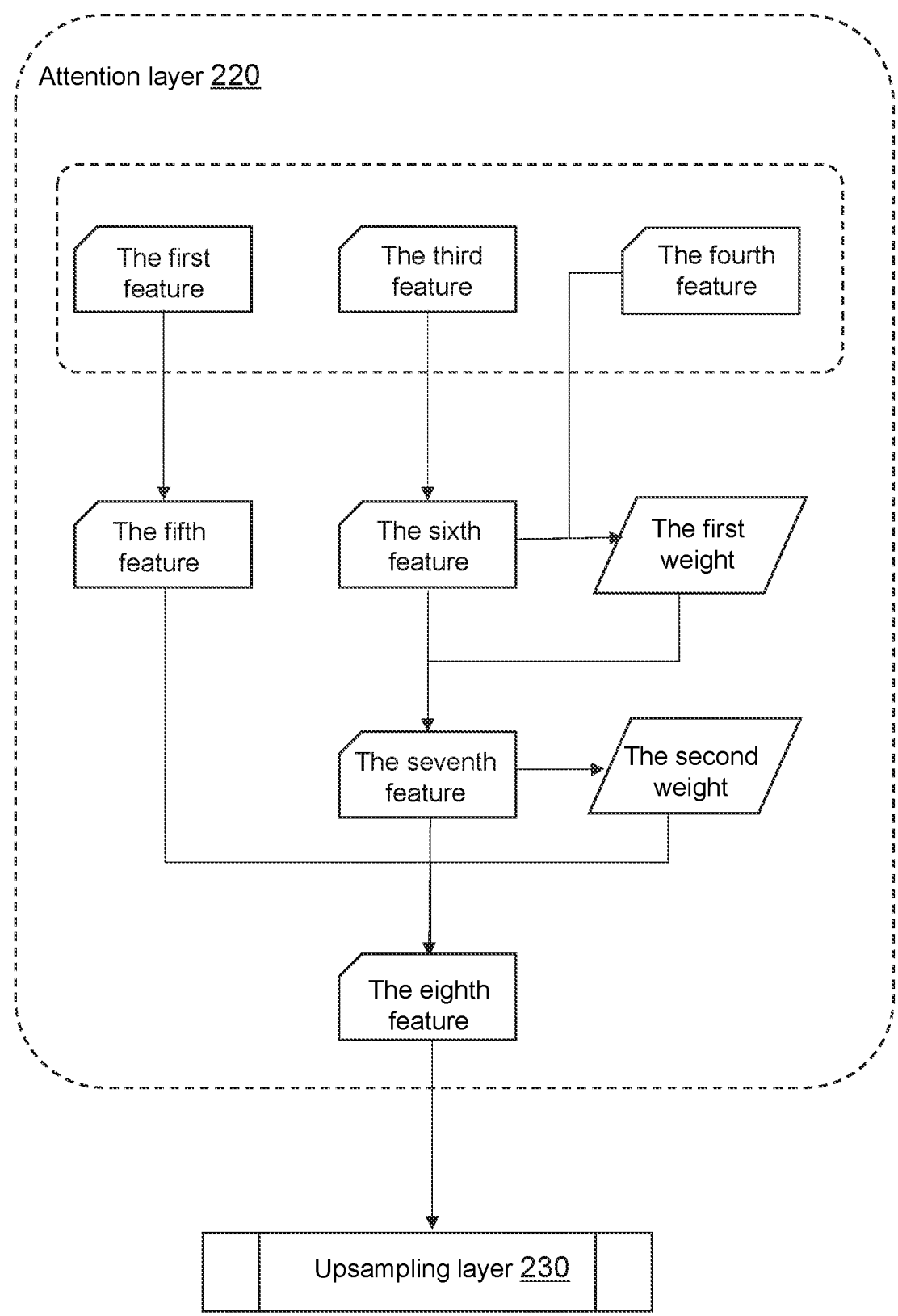
FIG. 3A is a structural diagram of an attention layer of a recognition model of a method for detecting a defect of a film according to some embodiments of the present disclosure.

FIG. 3A is a structural diagram of an attention layer 220 of a recognition model of a method for detecting a defect of a film according to some embodiments of the present disclosure.

In some embodiments, the attention layer 220 may determine a fifth feature based on the first feature using a first convolution, determine a sixth feature based on the third feature using a second convolution, determine a first weight based on the sixth feature and the fourth feature, determine a seventh feature based on the sixth feature and the first weight by a fusion calculation, and determine an eighth feature based on the seventh feature, the fifth feature, and the second weight. The eighth feature may be used as an input of the upsampling layer 230.

The sixth feature may be obtained by the convolution calculation based on the third extraction layer, and the fourth feature may be obtained from the fourth extraction layer, and the first weight determined based on the sixth feature and the fourth feature may reflect the need for enhancing the sixth feature. The first weight may be implemented by various attention mechanisms.

The seventh feature may be result of enhancing the sixth feature based on the first weight.

The fifth feature may be obtained by the convolution calculation based on the first extraction layer. Through a combination of the seventh feature and the fifth feature, the overall feature and the detail feature of the film image may be combined to make the recognition effect better.

In some embodiments, a size of convolution kernel of the first convolution may be larger than a size of convolution kernel of the second convolution.

In some embodiments, the first convolution may convolve the first feature through a convolution kernel with a size (5, 5) to obtain the fifth feature.

In some embodiments, the second convolution may convolve the third feature through a convolution kernel with a size (3, 3) to obtain the sixth feature.

Through the first convolution and the second convolution, the sub-feature size of the film image may be adjusted to facilitate subsequent calculations. The methods of some of the above-mentioned embodiments may better combine the overall feature and the detail feature.

In some embodiments, the first weight may remove noise information in the output of the third extraction layer to enhance the image. In some embodiments, the first weight may be a matrix reflecting an importance of elements in the sixth feature.

In some embodiments, determining the first weight may include calculating an element-based similarity of the sixth feature and the fourth feature.

The elements may be elements of the matrix in the sixth feature and the fourth feature.

The calculation of the similarity includes: calculating each element of the two matrices separately to obtain a similarity matrix, and each element of the similarity matrix is similarity of real values of corresponding elements of the two matrices. The similarity of two elements may be calculated in various ways. In some embodiments, the calculation method may include calculating a difference between the two real values, determining the similarity using a function to map the difference to a set (0, 1), if the two real values are the same, the similarity is 1, and the greater difference is, the closer the similarity is to 0. For example, the difference between two real values A and B is X, the difference may be mapped to the set (0, 1) using the function exp(−x), if A and B are the same, the similarity is 1, the greater the difference is, the closer the similarity is to 0. In the following descriptions, a symbol ⊗ is used to represent the calculation of the similarity.

After calculating the similarity, the obtained similarity matrix may be normalized to obtain the first weight.

Weight normalization refers to operation of making the weight within a certain range in order to eliminate adverse effects relative to other very large or very small weights. In some embodiments, the weight range may be from 0 to 1. In some embodiments, the normalization may be performed using a softmax function.

In some embodiments, the first weight may integrate the global information of the film image and highlight an area that needs to pay attention in the image. Compared with other attention algorithms, the above calculation method has less calculation, which can still achieve a good enough detection effect for detecting the scratch of the film and maintain the detection speed.

The seventh feature refers to an output feature obtained after the sixth feature is fused with the first weight. In some embodiments, the seventh feature may be determined based on the sixth feature and the first weight by a fusion calculation.

The fusion calculation refers to calculation that may fuse the sixth feature and the first weight. In some embodiments, an average summation may be used for the fusion calculation. In some embodiments, a weighted summation may be used for the fusion calculation.

Some of the above process may be expressed as:

$$X'=\mathrm{softmax}(X'_3 \otimes X_4)+X'_3,$$

where X' represents the seventh feature, $X'_3$ represents the sixth feature, and $X_4$ represents the fourth feature.

The eighth feature refers to an output feature obtained based on the seventh feature and the fifth feature. In some embodiments, the eighth feature may be determined based on the seventh feature and the fifth feature, and the eighth feature may be used as an input of the upsampling layer 230.

For example, the eighth feature may be obtained by averaging the seventh feature and the fifth feature.

In some embodiments, determining the eighth feature based on the seventh feature and the fifth feature may include performing the fusion calculation based on the seventh feature, the fifth feature, and a second weight, and the second weight may be determined based on the seventh feature by performing a channel attention operation. The channel attention operation includes performing two convolution calculations on the seventh feature and determining the second weight based on a similarity of results obtained from the two convolution calculations.

Specifically, the calculation of the second weight includes: performing two 1×1 convolutions on the multi-channels of the seventh feature, then performing an element-based similarity calculation on the results of the two convolutions, the method of similarity calculation being similar to the method of similarity calculation of the first weight, and performing weight normalization (for example, a softmax method) on the result of the similarity calculation. The convolution kernels of the two convolutions may be obtained by training the recognition model, and the parameters of the two convolution kernels may be different.

The methods of some of the above embodiments may be expressed as:

$$X''=\mathrm{softmax}(f^{1\times 1}(X') \otimes f^{1\times 1}(X_1'))+X_1'+X',$$

where X" represents the eighth feature, $X_1'$ represents the fifth feature, and $f^{1\times 1}(\bullet)$ represents the 1×1 convolution operation.

In some embodiments, the second weight may enhance the feature information output by the seventh feature to improve the recognition effect of the film image.

In some embodiments, the method of convolution and similarity calculation may be applied on the attention layer 220. Compared with the traditional attention layer, redundant operations are removed, which may better identify the film image and achieve the effect of faster calculation speed and less resource consumption.

Figure 3B:
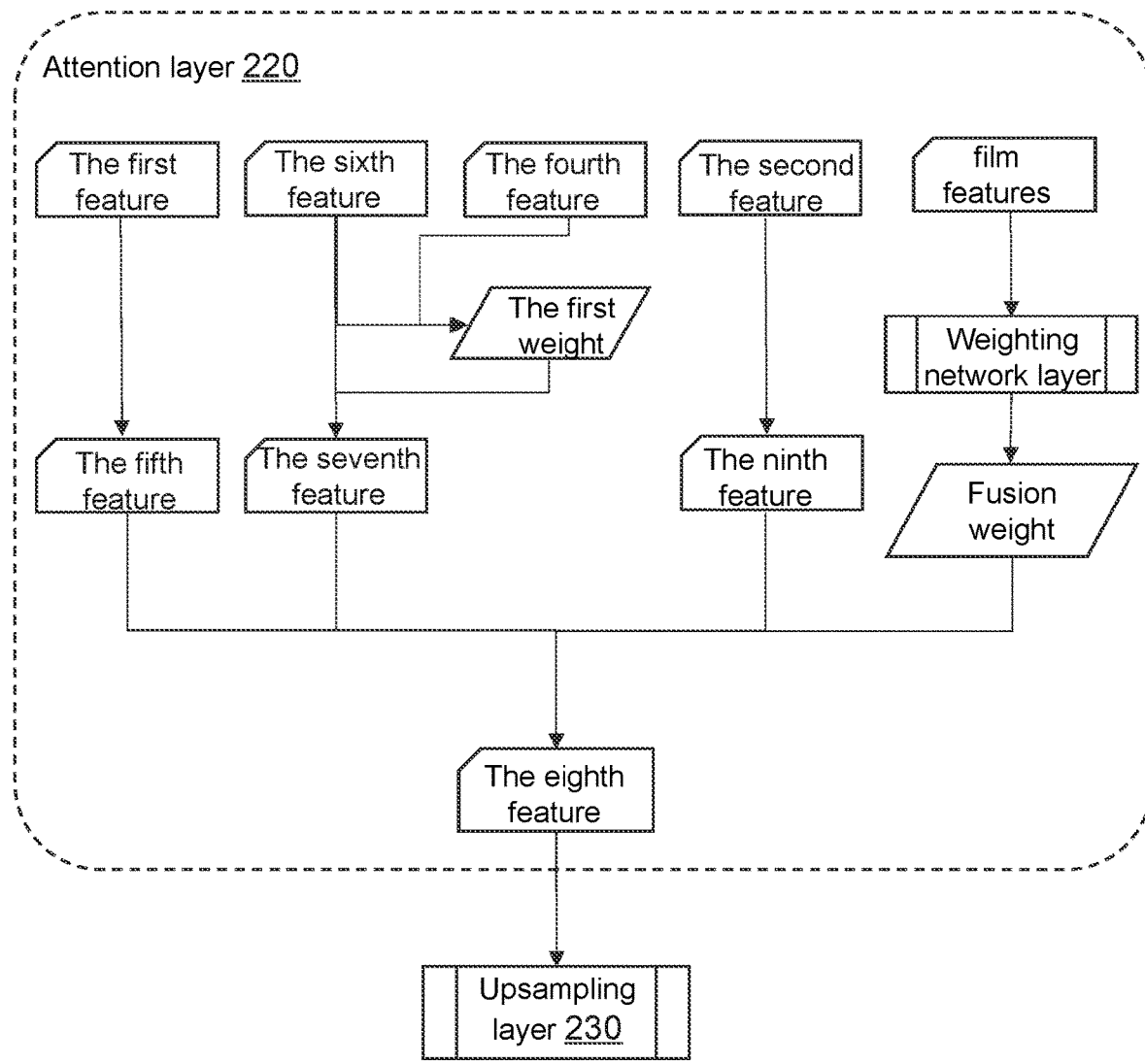
FIG. 3B is a structural diagram of an attention layer of a recognition model of a method for detecting a defect of a film according to other embodiments of the present disclosure.

FIG. 3B is a structural diagram of an attention layer 220 of a recognition model of a method for detecting a defect of a film according to other embodiments of the present disclosure. As shown in FIG. 3B, the eighth feature determined in the attention layer structure 220 may be used as the input of the upsampling layer 230.

In some embodiments, the attention layer 220 may determine a fifth feature based on the first feature, determine a first weight by an element-based similarity based on the sixth feature and the fourth feature, determine the seventh feature based on the sixth feature and the first weight by a fusion calculation, determine a ninth feature based on the second feature by a third convolution, and determine the eighth feature based on the fifth feature, the seventh feature, and the ninth feature by the fusion weight, and the eighth feature may be used as an input of upsampling layer 230.

The ninth feature refers to an output feature calculated by the third convolution of the second feature. In some embodiments, the ninth feature may be determined based on the second feature using the third convolution.

The feature of the film may be some features of the film itself, such as: material, color, smoothness, etc.

The fusion weight may be determined from the features of the film through a weight network. The weight network may be a neural network combined with a softmax function, and parameters of the weight network may be determined by joint training during the training process of the recognition model.

The fusion weight may be multiple values whose sum is 1, which corresponds to the fifth feature, the seventh feature, and the ninth feature, respectively. The eighth feature may be determined by calculating a weighted sum of the fifth feature, the seventh feature, and the ninth feature based on the fusion weight.

For example, the feature of the film may obtain the fusion weight of (0.3, 0.5, 0.2) through the weight network, then the eighth feature may be determined by summing the weighted product of the weight value 0.3 and the fifth feature, the weight value 0.5 and the seventh feature, and the weight value 0.2 and the ninth feature, which may be expressed as:

$$X''=0.3 \times X_1' + 0.5 \times X' + 0.2 \times X_2',$$

where $X_2'$ represents the ninth feature.

In some embodiments, the fusion weight determined based on the features of the film may better select degree of adoption of features with different sampling degrees according to the features of different films, which improves the detection effect. The generation of the fusion weight through learnable parameters further enhances the adaptability to different films.

Figure 4:
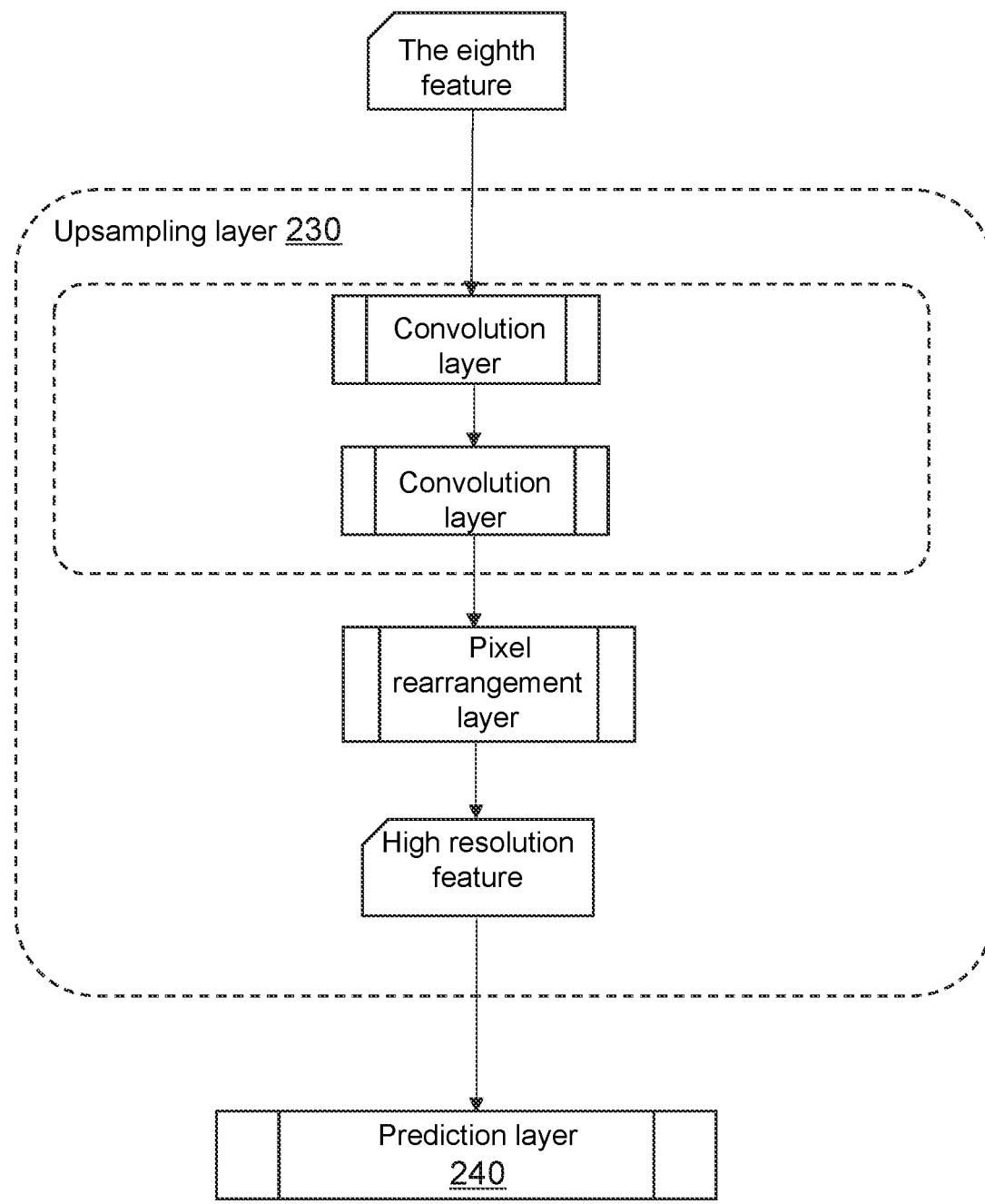
FIG. 4 is a structural diagram of an upsampling layer of a recognition model of a method for detecting a defect of a film according to some embodiments of the present disclosure.

In some embodiments, the upsampling layer 230 is shown in FIG. 4. FIG. 4 is a structural diagram of an upsampling layer of a recognition model of a method for detecting a defect of a film according to some embodiments of the present disclosure.

In some embodiments, the input of the upsampling layer 230 may be the eighth feature with lower resolution, and the output of the upsampling layer 230 may be sub-feature information with higher resolution after the upsampling operation.

The upsampling layer may include $r^2$ channel features obtained through a convolution processing of $r^2$ channels for each element of the eighth feature and r times upsampled features arranged periodically by the $r^2$ channel features.

The upsampling refers to a processing method of increasing some feature information of relatively small images. In some embodiments, a sub-pixel convolution may be used for upsampling.

In some embodiments, the sub-pixel convolution is a method of using convolution processing at the pixel level and then periodically rearranging the processing results to obtain high-resolution images.

The convolution processing of channel refers to a process of obtaining $r^2$ feature channels for each output channel through two concatenated convolution layers, and r is the upsampling times. For example, is upsampling is 3 times, 9 feature channels may be obtained for one output channel.

In some embodiments, the two concatenated convolutions may include concatenating two convolution layers, obtaining r feature channels for the output channel of the film image through the first convolution layer, and obtaining $r^2$ feature channels for the r feature channels through the second convolution layer.

In some embodiments, a pixel rearrangement layer may periodically rearrange the result of the second convolution. Specifically, the pixel rearrangement layer may periodically rearrange the low-resolution features of the $r^2$ channels of each pixel obtained by the second convolution into an r×r area to obtain a high-resolution feature image (a high-resolution feature).

For example, the following methods may be used:

$$I=PS(f(X'')),$$

where PS is a periodic pixel arrangement, which rearranges H×W×C·$r^2$ into rH×rW×C:

$$PS(T)_{x,y,c} = T_{[x/y],[y/r],C \cdot r \cdot mod(y,r) + C \cdot mod(x,y) + c}.$$

For example, four channels are required to increase the pixel by 2 times, and the four channels are numbered as 1, 2, 3, and 4, and the four channels are put into one channel, and the channel 1 may be placed in the upper left corner, the channel 2 may be placed in the upper right corner, the channel 3 may be placed in the lower left corner, and the channel 4 may be placed in the lower right corner. When one pixel passes through one channel, it becomes four pixels to complete the upsampling.

In some embodiments, sub-pixel convolution may be used for the upsampling, which uses learnable parameters for upsampling. Compared with traditional upsampling methods, the obtained effects through training may be better than that of setting artificially parameters.

In some embodiments, the prediction layer 240 may be a back-propagation network (BP network), etc.

In some embodiments, the prediction layer 240 may also include a regression layer 241 and a classification layer 242. In some embodiments, the regression layer 241 and the classification layer 242 may be various neural networks, or other model structures.

In some embodiments, an input of the prediction layer 240 may be high-resolution features after the upsampling, and an output of the prediction layer 240 may be the scratch information corresponding to the film image.

In some embodiments, the result of the upsampling layer 230 may be input into the prediction layer 240, and convolution kernels may be used for predicting, for example, (3×3) convolution and (1×1) convolution may be used for predicting respectively.

In some embodiments, the prediction result of the prediction layer 240 may include a predicted heatmap, a predicted width and height, and a predicted offset of a center point.

In some embodiments, the prediction result may further include a predicted target rotation angle.

In some embodiments, a heatmap may be used to predict the location of the center point of the scratch. In some embodiments, Focal Loss may be used for predicting the heatmap, and L1 Loss may be used for predicting the width and height, the offset of the center point, and angle. The losses may be fused and weighted by setting different weights as following:

$$LOSS = L_{hm} + \lambda_{size} L_{size} + \lambda_{off} L_{off} + \lambda_{ang} L_{ang},$$

where $L_{hm}$ is the heatmap loss, $L_{size}$ is the width and height loss, $L_{off}$ is the offset loss of the center point, $L_{ang}$ is the angle prediction loss, $\lambda_{size}$ is the weight of width and height loss, $\lambda_{off}$ is the weight of the offset loss of the center point, and $\lambda_{ang}$ is the weight of angle prediction loss. In some embodiments, a new recognition model, (i.e., a target recognition model) may be obtained based on LOSS training. In some embodiments, the weight of width and height loss, the weight of the offset loss of the center point, and the weight of angle prediction loss may all be taken as 0.1.

In some embodiments of the present disclosure, increasing the angle prediction may reduce the missed detection of the scratches and improve the detection accuracy of the scratches of the film.

In some embodiments, some embodiments of the present disclosure include a non-transitory computer-readable storage medium storing a set of instructions, when executed by at least one processor, causing the at least one processor to perform the method in the present disclosure.

In different parts of the present disclosure, the method for detecting a defect of a film may also be referred to as a method for detecting a defect of a film based on a rotating target and an improved attention mechanism. The recognition model may also be referred to as a network model. The first extraction layer may also be called Layer1, the second extraction layer may also be called Layer2, the third extraction layer may also be called Layer3, and the fourth extraction layer may also be called Layer4. The first feature may also be called $X_1$, the second feature may also be called $X_2$, the third feature may also be called $X_3$, the fourth feature may also be called $X_4$, the fifth feature may also be called $X_1'$, and the sixth feature may also be called $X_3'$, the seventh feature may also be called X', and the eighth feature may also be called X".

The following are more embodiments.

Figure 5:
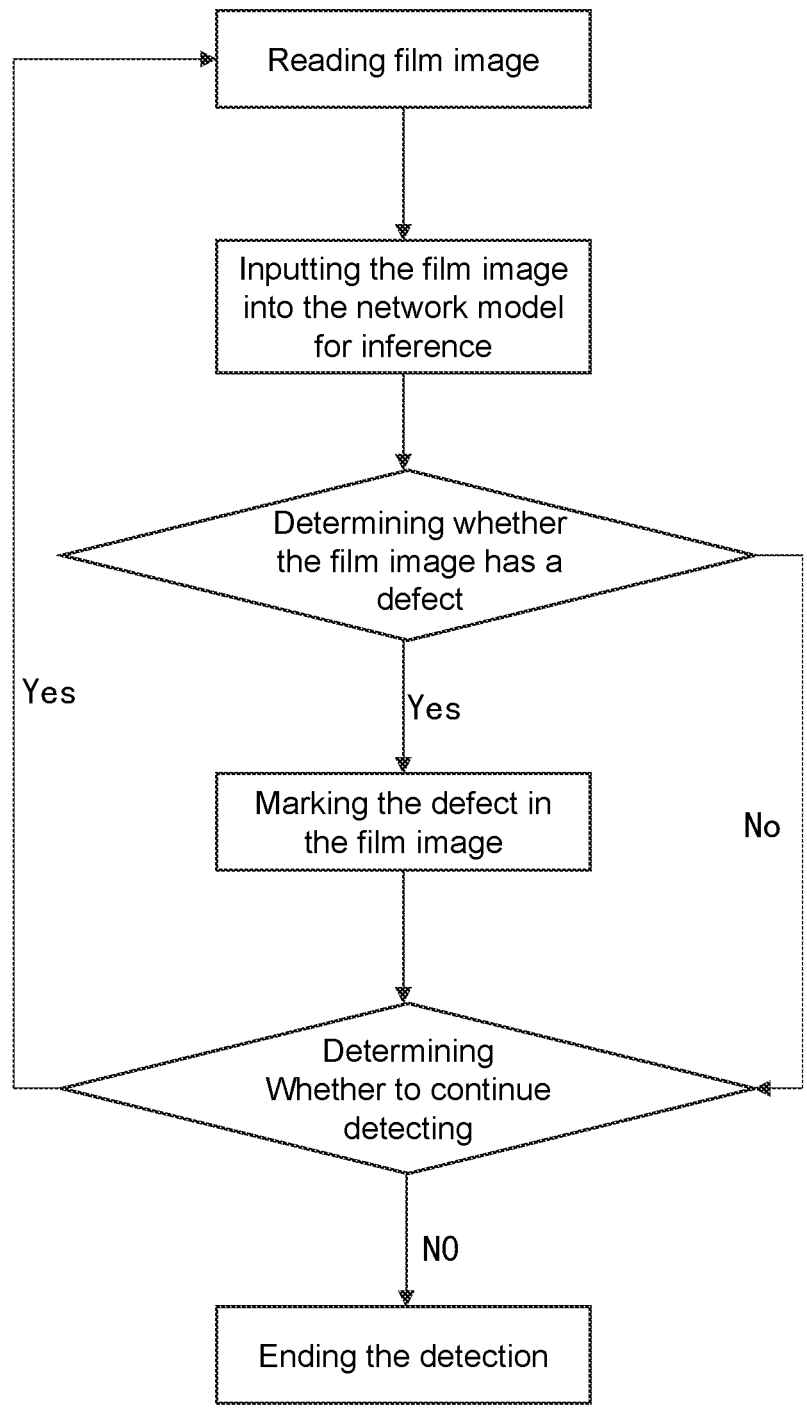
FIG. 5 is a flowchart illustrating an exemplary process of a method for detecting a defect of a film according to other embodiments of the present disclosure.

Some embodiments of the present disclosure provide a method for detecting a defect of a film based on a rotating target and an improved attention mechanism. The flowchart of the system for detecting a defect of a film is shown in FIG. 5, and the operations are as follows:

(1) reading film image in real time;

(2) inputting the film image into the network model for forward inference;

(3) entering the network to determine whether the film image has a defect, in response to determining that the film has a defect, entering operation (4), otherwise entering operation (5);

(4) marking the defect and prompting the film image to have a defect;

(5) determining whether there are still unread film images, in response to determining there are unread film images, turning back to operation (1), otherwise ending the detection.

Figure 6:
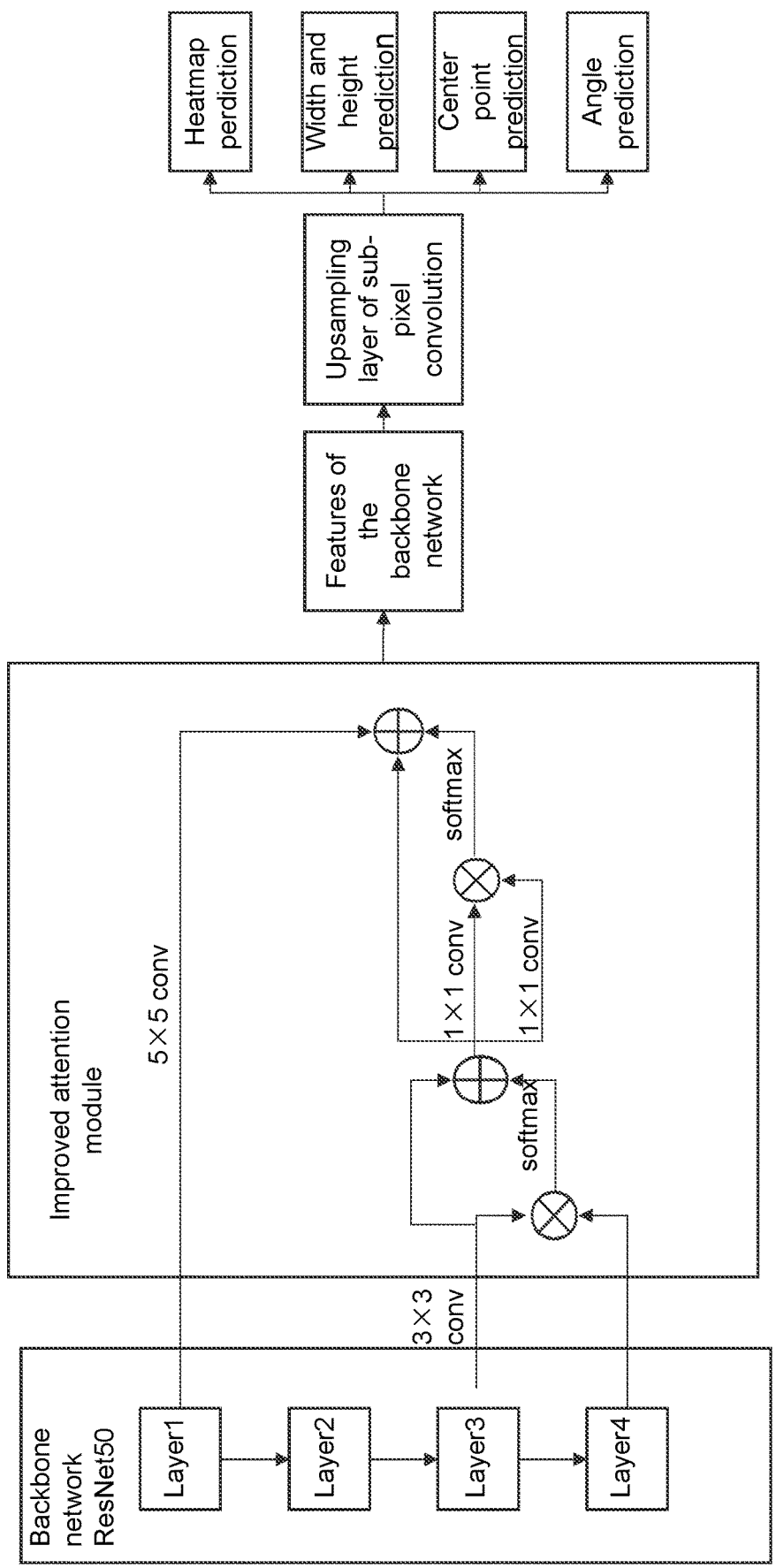
FIG. 6 is a schematic diagram of an improved detection network according to some embodiments of the present disclosure.

The network model is obtained by following:

In operation 1, obtaining a set of film data through collecting film images using an industrial camera and manually marking defects of the film;

In operation 2, obtaining a pre-trained network model of CenterNet through training the CenterNet network on the set of coco large-scale target detection data;

In operation 3, modifying structure of the pre-trained network model of CenterNet, and more descriptions may be found in FIG. 6. The first downsampling layer is removed in the backbone network Resnet50 of CenterNet to enhance the underlying details of the film image. Cross-layer fusion is performed on the output pixels of Layer3 and Layer4 of the backbone network ResNet50, and similarity weighting is used to enhance the output of Layer3, which fuses the global information and highlights the areas that need to pay attention in the feature map, and at the same time does not increase too much calculation, so as to keep the speed of detection. Then, the attention operation of the channel dimension is performed on the fusion result of Layer3, and the weighted enhancement is performed on Layer1. Sub-pixel convolution is used to replace the upsampling layer after the backbone network of CenterNet to protect the details of the data from interference and solve the problem of deconvolution artifacts. A rotation angle branch is added to the output of the backbone network to detect the angle of the target.

In operation 4, on the set of film data, inputting the film data into the modified CenterNet network, retraining the modified network model, predicting the heatmap using Focal Loss, and prediction the width and the height, the offset of the center point, and angle using L1 Loss, fusing the loss and setting different weights for weighting as follows:

$$LOSS = L_{hm} + \lambda_{size} L_{size} + \lambda_{off} L_{off} + \lambda_{ang} L_{ang},$$

where $L_{hm}$ is the heatmap loss, $L_{size}$ is the width and height loss, $L_{off}$ is the offset loss of center point, and $L_{ang}$ is the angle prediction loss, $\lambda_{size}$ is a weight of the width and height loss, $\lambda_{off}$ is the weight of the offset loss of the center point, $\lambda_{ang}$ is the weight of angle prediction loss, the weights are all 0.1, and a new network model (i.e., a target network model) is obtained by training.

The features in the improved network structure are processed by the structure of the improved CenterNet network model as follows:

(1) The input image X firstly passes through the backbone network of CenterNet and 4 Layer modules are used to extract features from the input image X in the backbone network ResNet50. The improved part removes the residual edge in Layer2 and modifies the stride of the convolution kernel to 1, so that no downsampling is performed in the Layer2 module. The pixel matrices $X_1$, $X_2$, $X_3$, $X_4$ are obtained in sequence after the image X passing through 4 Layer feature extraction modules.

(2) The pixel matrix $X_3'$ is obtained through performing the downsampling on pixel matrix $X_3$ using a 3×3 convolution operation, so that the pixel matrix $X_3'$ and the pixel matrix $X_4$ have the same feature size, the weight is obtained through calculating the similarity between the pixel matrix $X_3'$ and the pixel matrix $X_4$, the weight is normalized using the softmax function, X' is obtained through weighting and summing the weight and the pixel matrix $X_3$, $X_1'$ is obtained through downsampling on the pixel matrix $X_1$ using a 5×5 convolution operation, and final output X" of the backbone network is obtained through performing the channel attention operation on X' and weighting X' and $X_1'$ as follows:

$$X' = \text{softmax}(X_3' \otimes X_4) + X_3',$$

$$X'' = \text{softmax}(f^{1\times1}(X') \otimes f^{1\times1}(X')) + X_1' + X',$$

where $f^{1\times1}(\bullet)$ represents the convolution operation of 1×1.

(3) Sub-pixel convolution instead of deconvolution is used to for upsampling, $r^2$ feature channels are obtained for each output channel through processing the feature image through two convolution layers, r is the upsampling times, and low-resolution features of the $r^2$ channels of each pixel are periodically rearranged into an r×r region to obtain a high-resolution image as follows:

$$I = PS(f(X'')),$$

where PS is the periodic pixel arrangement, which rearranges H×W×C·$r^2$ to rH×rW×C as follows:

$$PS(T)_{x,y,c} = T_{[x/y],[y/r],C \cdot r \cdot mod(y,r) + C \cdot mod(x,y) + c},$$

(4) The results after upsampling using the sub-pixel convolution are sent to four branches using the 3×3 convolution and the 1×1 convolution respectively for predicting heatmap, width and height size, offset of the center point, and target rotation angle.

In operation 5, the target network model is loaded into the real-time system for detecting a defect of a film, and the real-time film data collected by the camera is loaded into the system for detecting a defect of a film.

Some embodiments of the present disclosure are mainly aimed at less film scratch data, small targets, and inconspicuous features, which greatly increases the difficulty of identifying and detecting using deep learning methods. The optimized structure proposed by some embodiments of the present disclosure is modified in the backbone network part of the CenterNet network to reduce one downsampling operation in the backbone network of the CenterNet, so as to make it more sensitive to detailed features. The attention module is used to weight the features that need to focus on and the cross-layer features are fused to make the network extraction features more complete and rich and increase expressiveness of the features, which is more suitable for detecting the scratch defects of the film proposed in some embodiments of the present disclosure. By adding the rotation angle prediction branch for scratch defects, the detection of targets with larger length or width is more convergent, which improves the detection of the scratch defects of the film.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Furthermore, the recited order of processing elements or sequences, or the use of numbers, letters, or other designations, therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the descriptions, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and described.

What is claimed is:

1. A method for detecting a scratch defect of a film based on a rotating target and an improved attention mechanism, comprising:

operation 1, obtaining a set of film data based on collecting a film image using an industrial camera and manually marking defects of the film;

operation 2, obtaining a pre-trained network model of a CenterNet based on training the CenterNet on a set of coco large-scale target detection data;

operation 3, modifying a structure of the pre-trained network model of the CenterNet, including:

removing a first downsampling layer in a backbone network ResNet50 of the CenterNet to enhance underlying details of the film image;

performing a similarity weighting on an output pixel of a third module Layer3 of the backbone network ResNet50 and an output pixel of a fourth module Layer4 using a cross-layer fusion to enhance an output of the third module Layer3, then performing an attention operation of a channel dimension on the third module Layer3, and performing weighting enhancement on the output of the third module Layer3 and an output of a first module Layer1;

replacing a upsampling layer after the backbone network of the CenterNet with a sub-pixel convolution; and adding a rotation angle branch to an output of the backbone network of the CenterNet to detect an angle of a target;

operation 4, obtaining a target network model by inputting the film data into the modified CenterNet and retraining the modified CenterNet on the set of the film data; and operation 5, detecting the scratch defect of the film through loading the target network model into a real-time system for detecting the film and loading real-time film data collected by the industrial camera into the system.

2. The method of claim 1, wherein the operation 3 includes:

obtaining a high-resolution feature image through using the sub-pixel convolution instead of a deconvolution for upsampling, processing a feature image by two convolution layers to obtain $r^2$ feature channels for each output channel, and periodically rearranging low-resolution features of the $r^2$ channels of each pixel into an r×r area, r being upsampling times.

3. The method of claim 1, wherein the operation 4 includes:

predicting a heatmap using a Focal Loss, and predicting a width and height, an offset of the center point, and an angle using a L1 Loss; and performing a weighting fusion by setting different weights for a heatmap loss, an offset loss of the center point, a width and height loss, and an angle prediction loss.

* * * * *